United States Patent [19]

Waite

[11] Patent Number: 4,981,524

[45] Date of Patent: Jan. 1, 1991

[54] CHEMICAL CONTROL OF ROOT GROWTH IN SEWERS AND THE LIKE

[75] Inventor: Diana H. Waite, Marysville, Mont.

[73] Assignee: Airrigation Engineering Co., Inc., San Jose, Calif.

[21] Appl. No.: 59,930

[22] Filed: Jun. 9, 1987

[51] Int. Cl.$^5$ ............................................. B08B 9/04
[52] U.S. Cl. ........................................ 134/24; 134/36; 134/22.13; 134/167 C; 134/168 C
[58] Field of Search ........... 134/24, 36, 167 C, 168 C, 134/22.13

[56] References Cited

U.S. PATENT DOCUMENTS

| | | | |
|---|---|---|---|
| 3,741,807 | 6/1973 | Horne | 134/24 |
| 3,874,926 | 4/1975 | Horne et al. | 134/24 |
| 4,011,100 | 3/1977 | Ross | 134/24 |
| 4,025,360 | 5/1977 | Horne et al. | 134/24 |
| 4,083,384 | 4/1978 | Horne et al. | 134/24 |
| 4,206,313 | 6/1980 | Cavoretto | 134/24 |
| 4,337,096 | 6/1982 | Clifford | 134/24 |
| 4,556,434 | 12/1985 | Woogerd | 134/36 |

Primary Examiner—Asok Pal

Attorney, Agent, or Firm—Owen, Wickersham & Erickson

[57] ABSTRACT

Coating with clinging foam the upper interior walls of a generally horizontal pipe. A high-pressure pump, connected to a source of water, delivers jetting water to a nozzle through a normally reeled hose. The nozzle has a body divided by a pressure-actuated valve into two chambers, the first one having a series of high-pressure jet exits. The valve is normally open and, when the high pressure is off, leads into a second chamber having a foam outlet. Two pump and metering devices and a compressor then deliver water, chemical and air mixed into a damp sloppy foam to the hose and then, after working at foam to the desired expansion ratio, to the nozzle. A skid supports the nozzle and has a series of skid rods regularly spaced around it so that at any time two of the skid rods engage the bottom part of the wall of the pipe to be coated and hold the nozzle well above the liquid flow in the pipe's bottom. A gravity-operated device at the outlet is connected to the foam outlet from the nozzle's second chamber and causes expulsion of the foam toward the walls of said pipe lying along a predetermined upper sector only, while preventing expulsion toward the bottom portion.

7 Claims, 3 Drawing Sheets

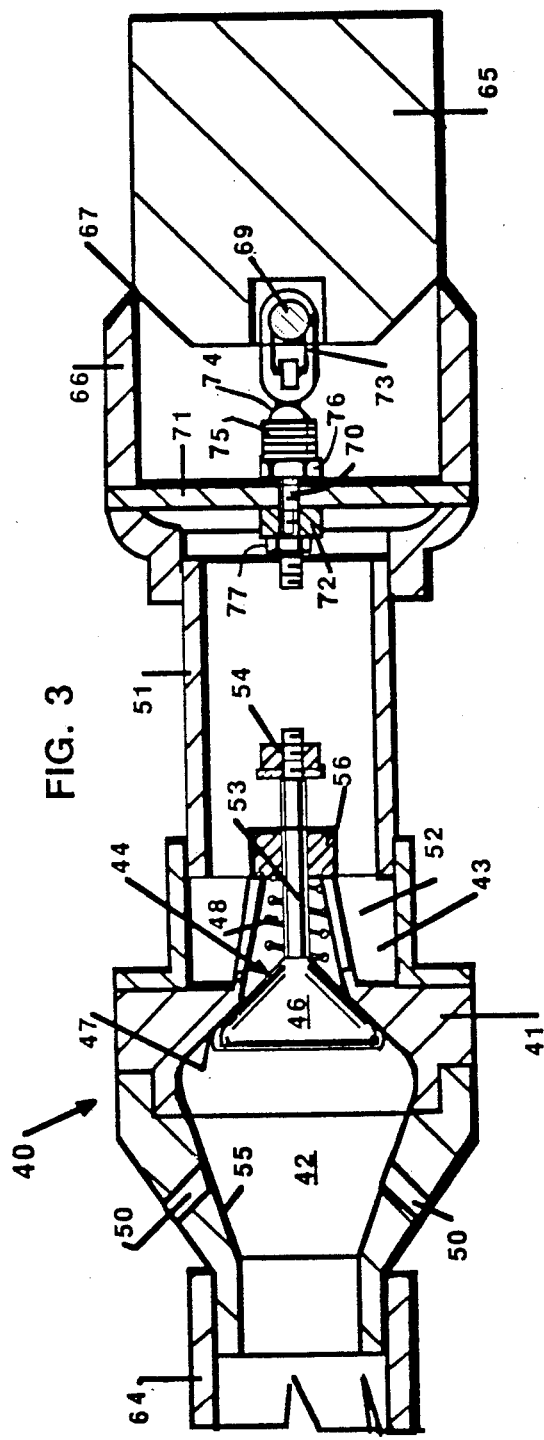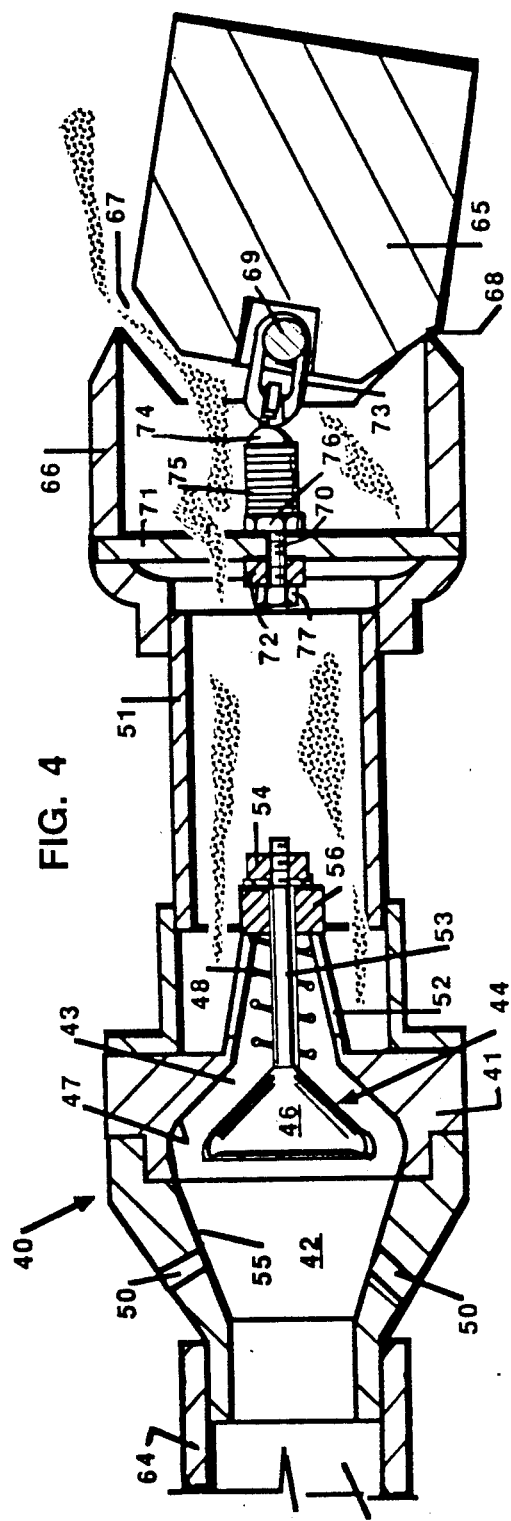

CHEMICAL CONTROL OF ROOT GROWTH IN SEWERS AND THE LIKE

This invention relates to the chemical control of roots in sewers. It also relates to a process for coating the upper interior walls of a generally horizontal pipe. It further relates to apparatus for use in the coating of the interior walls of pipes with foamed substances and especially to apparatus for the control of roots in sewers.

BACKGROUND OF THE INVENTION

Several patents relate to chemical treatment of sewers, for killing tree roots and other organic growth, including U.S. Pat. No. 3,741,807; 3,880,176; and 3,892,588. Treatment is sometimes done by injecting foam containing phytotoxic material into the sewer, as is illustrated by U.S. Pat. No. 3,874,926; 4,025,360; 4,083,384; and 4,556,434.

The treating chemical, when not a foam, was usually applied by completely filling a pipe with an aqueous solution or suspension of the chemical and then allowing a period for soaking. Soaking is best for relatively small-diameter sewer pipes; the pressure caused by filling the pipe forces the solution out of the cracks and into the joints and extends the protection well beyond the line; it increases residual control by dichlobenil herbicide which retards root regrowth. However, soaking becomes expensive when the pipes are large, because the sewer pipe must be completely filled with the expensive treating liquids. Storm sewers, which often need the treatment, are often so large that the soaking method is completely impractical and uneconomical.

The greatest drawback to soak treatment, however, is the ever-present danger of flooding adjacent structures. Therefore, this method cannot be used where either hills or basements are present. Because of these limitations other methods were devised which increasingly diminished the possibilities of spills.

Alternatively, the treating material was in the past sprayed onto the pipe walls, using a spray device that was pulled along inside the pipe. However, spraying has often not been sufficiently effective, because the sprayed material, even if it foams somewhat, has not clung sufficiently to the roots which are to be treated. Since the treatment requires exposing the roots to the phytotoxic material for a period of time, material which simply drips off the roots is often ineffective.

The selection of foam coating or of foam filling may be summarized as follows:

Lines that should be foam-coated:
 1. Large lines that are not filled with roots, but have roots around the perimeter of the pipe's interior.
 2. Lines that have deep, swift flows that would cause heavy erosion of the foam if the pipe was foam-filled. (Since the nozzle must be above the surface of the flow, the flows could not be deeper than half the pipe. Generally there is a low capacity time of day when flows are lessened; treatments should be reserved for this time of day or night.)
 3. Storm sewer lines in which foam-filling the
 3. Storm sewer lines would result in the herbicide reaching the outfall in unacceptable amounts.

Lines that should be foam-filled are all other lines that have root intrusions. Roots rated as light to heavy intrusions will soon grow. Early treatment of roots is the best possible Infiltration/Inflow prevention because it stops the roots from cracking the pipe.

Lines that would best be both foam-filled and foam-coated:
 1. Large lines that have intermittent massive intrusions of roots can be foam-filled for large intrusions but foam-coated for peripheral intrusions.
 2. Storm sewer lines that have massive intrusions of roots can be foam-coated within proper distances from the outfall, but foam-filled where intrusion require it and are far enough from the outfall.
 3. Smaller lines which the city feels don't need to be completely treated. Many times a city will try spot-treating lines which have large and very small intrusions intermittently. Although it is not a good policy to ignore the small intrusion, as above, many cities do so. Foam-coating the relatively root-free part of pipes to be spot-treated can be a way to assure some measure of control.

It has been found that generally the application of foam is more effective, especially when it is a clinging foam. The foam-coating method enables economical treatment of large lines. Lines in storm sewers that have outfalls into fresh water sources further profit by this treatment because it allows the lines to be treated without exceeding the amounts of herbicide that can be used in this situation without causing pollution of the watershed. Lines that have a fast, high flow rate would erode the foam too badly to allow the filling of the line. Foam-coating the line in that case is done because it is possible and practical to do so.

Heretofore, the application of foam has usually been done through a conduit that was passed through a plug into a chosen area. The foam generally was relatively slow acting, so that in the past, or stated above, the pipe had to be filled with the foam. Filling the pipe with foam wasted less material than filling the pipe with a liquid solution (because the foam contains twenty times as much air as it does liquid). Excess waste of the foam is not an issue in filling reasonably small lines. But waste can occur when the line is sprayed and the chemical runs away, or foamed when too large to form a plug with the foam itself, because the foam floats on the water below for the most part and erodes or floats away before the line can be filled. The ejected foam, therefore, is ideally sprayed above the liquid flow, because the flow in that case would certainly carry away any foam falling in the water in the foam-coating process. Even in filling the line, because the foam floats, the issue of roots not growing below the surface of the water, except when "horse tails" fill the line, is still not a waste of foam. The foam will catch on horse tails and kill what is above the water. What is in the flow is generally slowly dying and being rotted away by the septic, anaerobic condition of the flow. But the horse tail roots generally enter the line above the flow and the feeder root is killed by the herbicide. The volume of large lines can also result in waste if filled when the roots were only peripheral.

OBJECTS OF THE INVENTION

One object of the present invention is to provide a more efficient system for killing roots in large-diameter sewer pipe by applying to the sewer walls and the roots a clinging foam, without having to fill the pipe with the foam or with liquid.

Another object of the invention is to provide a simple system for applying such clinging foam, when using the system for sewer root control, and for limiting the application to the portions of the pipe where it will do the most good, i.e., the portions above the flow of water or aqueous solution in the pipe.

Another object of the invention is to provide efficient apparatus for accomplishing this method and for applying this system.

SUMMARY OF THE INVENTION

Viewed as a method, the invention applies a clinging foam to the upper portion of the interior walls of a generally horizontal pipe. The method employs a nozzle, having a body divided by a pressure-actuated valve so that high pressure water can be applied to the nozzle in such a way as to cause a propelling jet to issue from the rear of the nozzle, to propel the nozzle and its water-supplying hose along the pipe and at the same time to unreel the hose for some predetermined length.

After that length is reached, the high-pressure supply of water is turned off, and the system is used to send foam into and through the nozzle. Preferably the foam formed by mixing its ingredients (chemicals, water and air) are then worked in the hose. The mixture of three materials, which are metered and mixed by a foam-making machine to provide the proper proportions and to combine the air, water, and the foam-producing solution containing the herbicide, provides a damp sloppy foam, which is worked to a proper state while in transit to the nozzle. Small foam-makers that have only 10 feet of hose and are used in the house lateral market, employ a bead tube to work the foam into a 20:1 foam in the foam-maker itself. This is not necessary or practical in the large units that must use long (500–1100) foot hoses, because if the foam is worked too much it is expanded too much, becoming too dry to apply the correct amount of herbicide per foot to the line to get a good kill. When a very long (900–1100 ft.) hose is used, the chemicals must sometimes be metered at different rates to avoid too dry a foam for a proper kill.

Since the high-pressure source of water has been turned off, the valve automatically opens, and the foam therefore goes through the nozzle and out its front or forward end. At the same time, the hose is reeled, pulling the nozzle back through the pipe at a rate matched to the flow of foam from the nozzle into the pipe.

The foam-making apparatus as such, meters the chemical and water, but not with metering pumps. Metering is done by regulating the pumps back to a certain pumping gpm, and then a flowmeter and globe valve are used to bypass correct amounts of fluid to allow the correct gpm for the mixture. The fluid is all that is metered, not the air. The fluid quantities are adjusted to the entire air flow from the compressor, to provide the proper dampness and expansion ratio of the foam.

The method calls for directing the foam to the upper part of a pipe walls. A gravity control on the nozzle is employed so that the foam is always properly directed. Moreover, the nozzle is carried at a height above any water in the pipe, usually at about the center of the pipe. Being above any liquid flowing along the bottom of the pipe, the foam does not have to flow through that liquid. The lower portion of the pipe is shielded from application of the clinging foam; all the foam is directed against the upper part of the pipe walls. This does not necessarily mean that it will all be above the center of the pipe. It may be directed to some points below the center, but at least the foam is not directed into the water being carried by the pipe; since without filling the pipe with foam, no "plug" of the foam can be created to keep the foam in the section to be treated, so that foam sprayed into the water would flow away and be wasted.

The apparatus of this invention comprises separate sources for water, the foam-producing solution, containing herbicide, when use for sewer root control, and the air. A high pressure pump is connected to the source of water, and the water under high pressure is conducted through a first downstream conduit to a three-way valve. A lower pressure pump and a metering device conducts water to a second downstream conduit, in which it is joined by the foam-producing solution of herbicide from a second pump and a second metering device, and, later on, by air from a compressor. This second conduit conducts the metered amounts and evenly mixes them on the way to the three-way valve.

The three-way valve, thus, has two inlets, one for the high-pressure water and one for the lower-pressure foam. At any one time, the valve outlet provides either the high-pressure water or the lower pressure foam, but not both at the same time, to a long hose extending from the outlet of the three way valve. The hose extends to the applying nozzle. Normally, the hose is reeled, and the reel is made to unreel freely, when the nozzle is jetted along the pipe: the reel has power means for positively reeling it in while applying the foam.

As indicated above, the nozzle has a body that is divided by a pressure-actuated valve into a first chamber adjacent to the hose and a second chamber beyond the valve. The first chamber, at the rear of the nozzle, has a series of jet openings which, when the valve is closed by high pressure, send the high-pressure water back in the direction of the hose and at a slight angle out toward all walls of the pipe. This provides motive power for moving the nozzle and meanwhile unreeling the hose to provide the necessary length to get the nozzle to some desired end location, which may be several hundred feet away from the entrance through which the hose and nozzle are initially placed. The nozzle or the hose just behind it are supported by a skid which preferably has six skid rods regularly spaced around it. The skid is of smaller diameter than the pipe itself. At any one time at least two legs or rods of the skid support the hose adjacent the nozzle and support the nozzle up at about the mid-point of the pipe, usually somewhat below it.

After the nozzle has been jetted to its desired position, the high-pressure stream of water is turned off, the nozzle valve opens, the three-way valve is turned to the foaming mode, the foam-maker is turned on to supply the foam produced from the metered water, the foam producing solution and herbicide (when using the system for sewer root control), and the air, to the hose and from there into the nozzle. The valve in the nozzle is open at this stage to let the foam go on through into the second chamber. The hose itself acts to work the initial foam into a foam with the necessary expansion ratio, usually 20:1. At the outlet end of the nozzle is a gravity-operated outlet device which directs the foam toward the walls of the pipe from some predetermined level and upwardly therefrom, so that only a predetermined upper portion of the pipe and any roots thereon are coated with the foam. The foam itself is therefore economically provided and is directed to where it will be productive.

The herbicide formulation for root control may be any of several types, but a preferred type is based on metham, which is sodium methyldithiocarbamate. An amount equivalent to about 28.4% anhydrous metham is applied, along with dichlobenil, or 2,6-dichlorobenzonitrile, preferably at about 1.75-2%. In addition, this formulation contains both anionic and non-ionic surfactants and foaming agents in an amount to bring the formula total to 100%.

Water is metered in amount such that the herbicide-foaming agent formulation comprises about 7.5% by volume, and the water about 92.5% of their mixture. Percentages may vary somewhat. Next, air is applied at about twenty times the volume of the water-herbicide mixture.

Application is preferably made at a solution temperature of 40°-80° F., and the nozzle is retracted at a rate determined by the amount of space above water, the pipe diameter, and the rate of application of the foaming material itself.

Other objects and advantages of the invention will appear from the following description.

BRIEF DESCRIPTION OF THE DRAWINGS

Fig. 3 is a view in section of the nozzle with its valve shown in its closed position, for jetting.

FIG. 4 is a similar view showing the valve open for application of foam.

DESCRIPTION OF A PREFERRED EMBODIMENT

Figure 1:
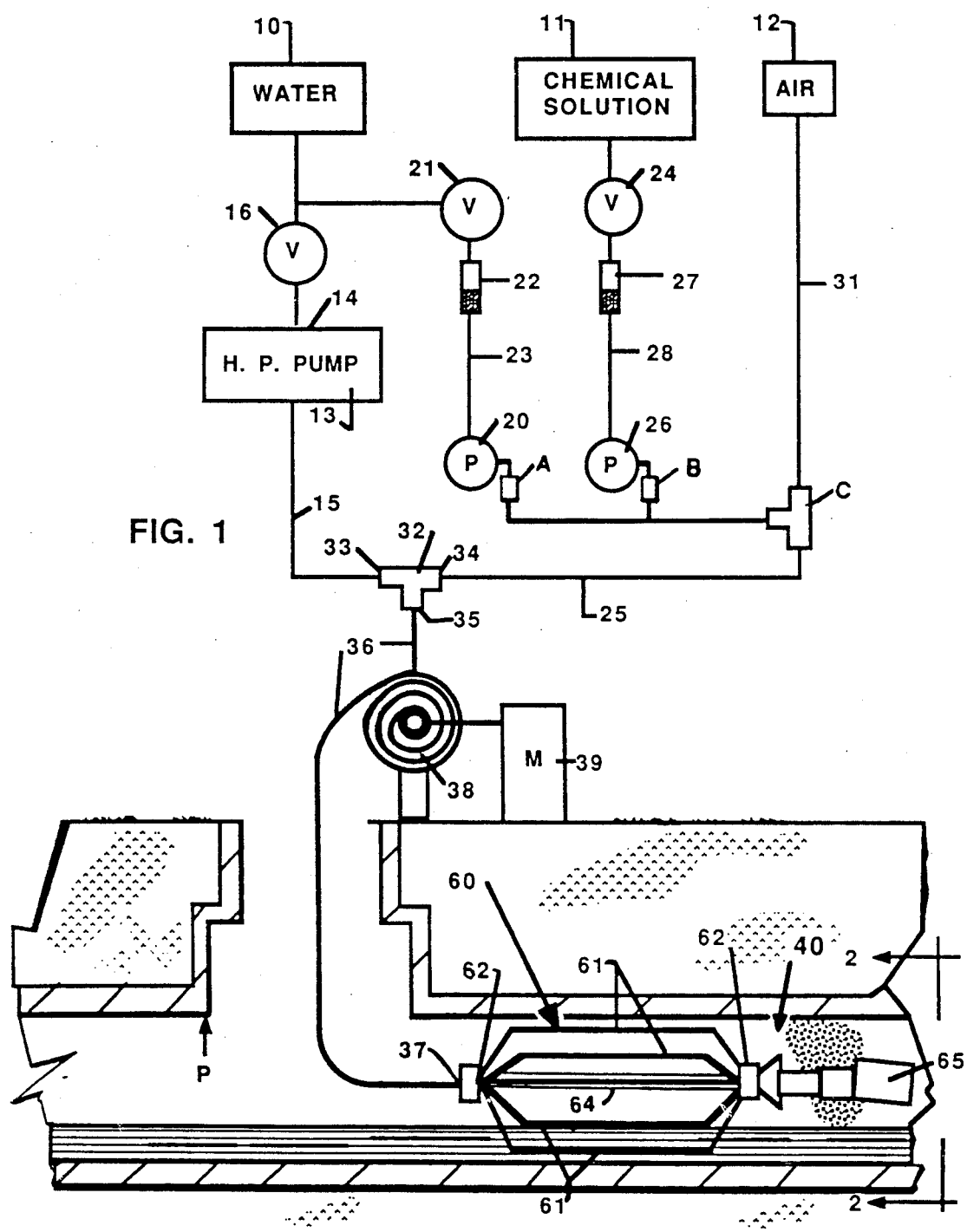
FIG. 1 is a diagrammatic view of a system embodying the principles of the present invention.

As shown in FIG. 1 there is a source 10 for water, a source 11 for the foam producing and herbicide chemical solution, and a source 12 for air.

A high pressure pump 13 is connected as by a short conduit 14 to the source 10 of water and to a first downstream conduit 15, which conducts the water at high pressure from the pump 13. There is a shut-off valve 16.

A metering device A is connected to the water source 10 by a shut-off valve 21, a filter 22, a conduit 23, and a pump 20 for metering water, at a pressure much lower than that supplied by the pump 13, and the outlet from the metering device A is connected to a second downstream conduit 25. A second metering device B is connected by a shut-off valve 24, a filter 27, a short conduit 28, and a pump 26 to the source 11 of foam-producing herbicide solution, and the metering device B is also connected to the second downstream conduit 25.

A compressor 12 uses atmosphere as its air source and then joins a conduit 31 which is also connected to the second downstream conduit 25. As a result, all three ingredients—water, foam-producing herbicide solution, and air—are fed through the second downstream conduit 25. Mixing takes place in a mixing valve C and continues in the conduit 25, and soupy foam results at that stage. As will be explained, downstream from the mixing valve C and the conduit 25, this soupy foam turns into a foam having between a 15-to-1 and a 20-to-1 expansion ratio. The chemical for foam-coat is designed to provide a damper foam when not filling and coating too. The damper foam provides a clinging foam that can slide somewhat and penetrate root masses by ejection alone.

A three-way valve 32 has two inlets 33 and 34 and an outlet 35. The inlet 33 is connected to the first downstream conduit 15 and the inlet 34 is connected to the second downstream conduit 25. To the outlet 35 a long hose 36 is connected. The hose 36 is quite long, often five or six hundred feet long, and has an outlet 37. Between the valve outlet 35 and the hose outlet 37, usually close to the three-way valve 32, is a reel 38 and power means 39 for causing the reel 38 to reel in the hose 36. Preferably, the reel 38 unreels automatically without power assistance during jetting.

The hose 36 is sufficiently rough inside so that the soupy foam is worked into a foam with up to a 20-to-1 expansion ratio, the working being done inside the hose long before the foam reaches the outlet 37.

Figure 5:
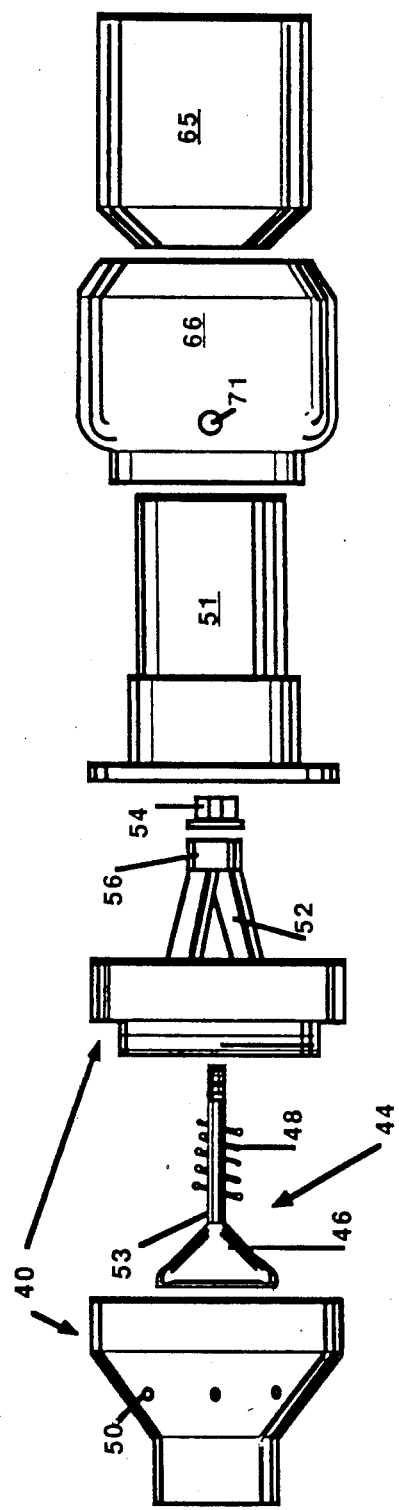
FIG. 5 is an exploded view in elevation of the nozzle.

A nozzle 40 (supported on a skid 60) is connected to the outlet 37 through a pipe 64 of the skid 60, as explained below. The nozzle 40 (FIGS. 3-5) includes a body 41 having a first chamber 42 adjacent the pipe 64 of the skid 60, and a second chamber 43 forward thereof on the other side of a pressure actuated valve 44. The valve 44 comprises a movable member 46 and a seat 47 at the forward end of the first chamber 42. The valve member 46 may be biased by a spring 48, as explained below.

The first chamber 42 is provided with a series of jet openings 50 which are directed rearwardly toward the skid 60 and hose 36 at a 15° angle to the horizontal hose 36 and where it came from. The second chamber 43 opens into an outlet fitting 51, and inside the chamber 43 is an open work structure 52, which supports a valve stem 53 around which is the spring 48. A nut 54 secured the valve stem in a desired position. The spring 48 normally acts to open the valve 44, and the valve 44 is closed only when the pressure against the member 46 reaches a critical amount. This critical amount is exceeded when the high-pressure water is directed into the nozzle 40, but is not reached during the application of the foam.

When the high-pressure flow of water, at about 800 psi, is introduced into the nozzle 40 from the hose 36, the valve is closed. The first chamber 42 has a frusto-conical surface 55, which increases in diameter towards the seat 47. The high pressure flow impinges on the normally open valve member 46 to force it into engagement with the similarly shaped valve seat 47.

The plurality of high-pressure orifices 50 cant outwardly and rearwardly toward the hose 36. When the valve 44 is closed, as shown in FIG. 3, the high pressure flow exits the nozzle 40 through the orifices 50 in the form of high pressure jets. These jets propel the nozzle 40 on the skid 60 through the sewer line P in which the nozzle 40 is inserted, and the reaction force thereof moves the nozzle 40 and its connected hose 36 through the line P.

Suitable biasing means, such as the helical spring 48 caged between the valve member 46 and an abutment member 56, urge the valve member 46 away from the seat 47, so that when no high pressure flow is present, the valve member 46 is moved away from the seat 47 to the position shown in FIG. 4. Thereafter, when low pressure foam is introduced through the hose 36, it flows from the first chamber 42 past the valve 44 and out into the second chamber 43. The foam thereafter flows into the conduit 51.

Figure 2:
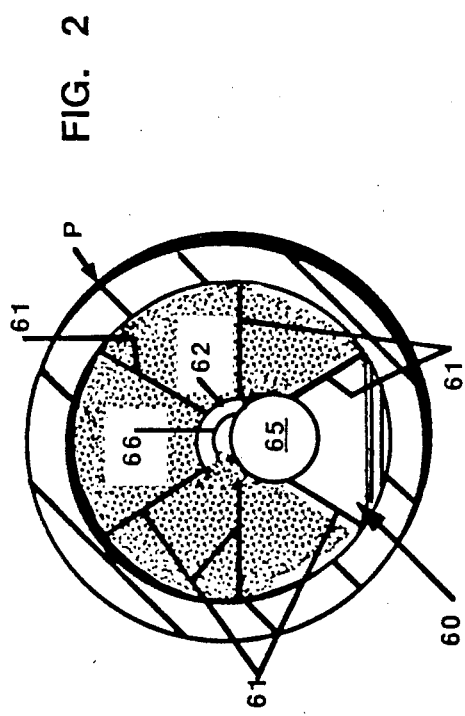
FIG. 2 is an enlarged view of the nozzle applicator and its accompanying skid and the direction controller for the nozzle's outlet.

The hose 36 is connected to the nozzle 40 by a special skid 60 (FIGS. 1-3) which holds the nozzle 40 at sufficient height so that it and its outlet will always be held above the liquid flowing at that time through the pipe P. Coating, of course, is not applied at a time when the pipe would be full, as for example, in a storm sewer during a heavy rain. Application to a storm sewer is made when the pipe is substantially dry or has only a little water running in it. Sanitary sewer pipes, used to conduct waste, are made so that they will be large enough not to be filled by the waste material in the pipe, which may rest an inch or two deep in the pipe P.

The skid 60 comprises, preferably, an open work hexagon, that is, six rods 61 evenly spaced around and extending longitudinally of the nozzle 40 or the hose 36, not only supporting the end 37 of the hose 36 above the water in the pipe P, but also, due to its shape assuring that the nozzle 40 will always be supported above the sewage flow, no matter what its rotational position may be. At any one time, two of the legs 61 rest on the pipe wall, near the bottom of the pipe. The six rods 61 are at each end brought up to and connected to each other by central rings 62. The rings 62 are connected to each other by a one-inch pipe 64. One ring 62 connects to the hose 36 at the hose outlet 37 at the rear of the skid 60, and another ring 62 connects to the nozzle 40 at the front end of the skid 60.

When the high-pressure water is applied to the nozzle 40, skid 60 is moved along with it by the jetting action, and the nozzle 40 rides along above the water protected by the skid 60. The limited contact of the leg 61 helps to enable the jetting operation to move the assembly. On retraction, the reeling engine 39 is operated to retract the hose 36 at the proper rate, so as to bring the foaming nozzle 40 back at such a rate that the foam will be suitably applied. From much experimentation and mathematical work, a table has been worked out, which shows the preferable rate, it is as follows:

| Pipe Diameter | Retrieval Rate | |
|---|---|---|
| 18" | 3 sec./ft. | × percentage of space above water |
| 20" | 3.5 sec./ft. | × percentage of space above water |
| 22" | 3.9 sec./ft. | × percentage of space above water |
| 24" | 4.3 sec./ft. | × percentage of space above water |
| 26" | 4.7 sec./ft. | × percentage of space above water |
| 27" | 4.9 sec./ft. | × percentage of space above water |
| 28" | 5.1 sec./ft. | × percentage of space above water |
| 30" | 5.5 sec./ft. | × percentage of space above water |
| 32" | 5.9 sec./ft. | × percentage of space above water |
| 36" | 6.7 sec./ft. | × percentage of space above water |
| 40" | 7.4 sec./ft. | × percentage of space above water |
| 44" | 8.2 sec./ft. | × percentage of space above water |
| 48" | 9.0 sec./ft. | × percentage of space above water |

Thus, considering the invention as described so far, when the high-pressure water is applied, with the three-way valve 32 open for it and closed to the foam, the water acts to close the valve 44, and then is jetted out through the openings 50, the force thereof causing the nozzle 40, the skid 60, and the adjacent assembly to jet along or slide along the bottom of the pipe P for a predetermined distance. Then it is stopped when the high-pressure water supply is turned off, and the device is ready for foam application.

The foam, if it were not otherwise regulated, would simply then flow out of the second chamber 43 into the pipe P. When it is thought necessary to fill the entire pipe with foam, this is considered satisfactory, but in larger-diameter pipes, in relation to economy of operation, and practical possibility where flows are deep or fast, it is not and never was truly satisfactory. However, it did operate to kill the roots though much material was wasted.

In the present invention, a gravity operated weight or shield 65 (FIGS. 3–5) is carried by an outlet fitting 66. The weight 65 must be heavy enough not to be lifted by ejection of the foam, but preferably is light enough so that it will not place too great a load on the jetting operation and require too high a water pressure. The same is true of the structure of the nozzle itself and of the accompanying apparatus. The weight 65 is adjusted so that it will extend far enough beyond an annular outlet opening 67 to cause it to weight down, and therefore shield the lower portion 68 from application of the material. By regulating its distance, the opening at 67 can be made larger or smaller to accommodate larger or smaller amounts of material, and also to regulate its ejection pressure and its angle of projection. The weight 65 is connected to a center bolt 70 (held by a rod 69) with a loop member 73 allowing the weight 65 to droop and act as shield means for shielding the lower portion of the foam outlet 67. The amount of droop is regulated by the connection of the bolt 70 through a bar 71 by a nut 72.

In order to prevent displacement of the weight 65 by any cause, the bolt 70 may be provided with an end nut 74 providing an end stop and a series of washers 75 between the end nut 74 and a second nut 76, positively preventing displacement. Moreover, the nut 72 beyond the bar 71 may be locked up by a lock nut 77. The angle of droop may be changed by changing the number or width of the washers 75.

To adjust the gap thereby provided, the fitting 66 is disconnected from the member 51. Then the lock nut 77 and the nut 72 are removed. The nozzle bob is then unscrewed from the bar 71. To increase the gap, more washers 75 are added; to decrease the gap some of the washers 75 are removed. Then the parts are reassembled.

In some instances sanitary sewer pipes have a concentrated infestation of roots at known locations and then have many fewer roots for long distances, though still requiring the foam coating provided by this invention. In such instances, more foam can be added at the concentrated infestation, either to fill the pipe there or at least deposit much more foam in those known locations than at other places. This can be done in the present application by simply slowing the retrieval rate in those areas and then resuming the normal retrieval rate after pulling the nozzle past those areas. For example, as shown earlier, an 18" pipe may employ a retrieval rate for normal foam coating of three seconds per foot. If a particularly infested area occurs, then for that area the retrieval rate may be slowed down to six or nine seconds per foot, whatever is needed to get the required amount of foam into those areas and attack the roots there. Then, retrieval can continue at the normal rate.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A method for coating with clinging foam, especially herbicidal foam, the upper portion of the interior walls of a generally horizontal pipe, for the purpose of controlling root growth and other organic growth in the pipe, employing a nozzle having a body divided by a water pressure actuated valve means into a first chamber having a series of high-pressure rearwardly facing jet exits and a second chamber having a front foam outlet, comprising:

sending water at high-pressure into said nozzle to close said valve means and to close off said second chamber so that the water exits via said jet exits from said first chamber, thereby to jet said nozzle along said pipe from a first position to a desired second position, while unreeling said hose, cutting off high-pressure water from said nozzle with consequent opening of said nozzle's valve means, sending metered amounts of a foamed mixture of water, foam-producing solution, and air to a long hose connected at an outlet to said nozzle, working in transit the foamed mixture to produce a clinging foam with a desired expansion ration, and reeling said hose back from said second position to said first position and pulling said nozzle along said pipe, expelling said foam through the first foam outlet toward a predetermined sector only of the walls of said pipe and preventing expulsion of said foam toward the bottom portion of said pipe walls.

2. A method for coating the upper interior walls of a pipe with clinging foam, especially herbicidal foam, in order to control root growth and other organic growth within said pipes, comprising:

generating a clinging foam in a system prior to and leading up to a foam ejecting nozzle, moving said foam-ejection nozzle unit along and through a pipe while ejecting said foam only along a sector lying well above the bottom of the pipe and pointing upwardly, and sending said foam to said nozzle at a rate corresponding to the rate of movement of said nozzle, for ejection from said orifices.

3. The method of claim 2 comprising holding the entire nozzle unit at all times well above the bottom of said pipe.

4. The method of claim 2 comprising varying the rate of movement of said nozzle to accommodate conditions requiring increase and decrease of the quantity of foam to be ejected at different areas of the pipe.

5. The method of claim 2 comprising shielding the lower portion of the foam outlet for said nozzle to prevent the flow of foam therethrough and moving said shielding relative to said nozzle outlet as required for shielding and covering the lowest portion thereof whatever the attitude of said nozzle.

6. The method of claim 5 wherein said shielding is moved by gravity for assuring that the shielding is down at the gravity bottom of said nozzle.

7. A method for coating with clinging foam the upper portion of the interior walls of a generally horizontal pipe, for the purpose of controlling root growth within said pipe employing a nozzle having a body divided by a liquid-pressure-actuated valve means into a first chamber having a series of high-pressure rearwardly facing jet exits and a second chamber having a front foam outlet, comprising:

sending water at high-pressure onto said nozzle to close off said second chamber so that the water exits via said jet exits from said first chamber, thereby to jet said nozzle along said pipe from a first position to a desired second position, while unreeling said hose, cutting off high-pressure water from said nozzle with consequent opening of said nozzle's valve means, sending metered amounts of a low-pressure foamed mixture of water, foam-producing solution, and air to said valve means and from there to said foam outlet, reeling said hose back toward said first position and pulling said nozzle along said pipe, and expelling said foam from said foam outlet and against the walls of said pipe.

* * * * *